United States Patent [19]

Morgan

[11] Patent Number: 4,662,959
[45] Date of Patent: May 5, 1987

[54] FIBERGLASS GASOLINE TANK REPAIR PROCESS

[76] Inventor: Howard F. Morgan, 4798 Hattrick Rd., Ravenna, Ohio 44266

[21] Appl. No.: 666,898

[22] Filed: Oct. 31, 1984

[51] Int. Cl.⁴ ............................................. B32B 35/00
[52] U.S. Cl. .................... 156/94; 29/402.09; 156/153; 206/582; 427/140; 427/290; 428/63
[58] Field of Search ............... 29/402.09; 156/94, 153; 206/582; 427/140, 290; 428/63; 264/36

[56] References Cited
U.S. PATENT DOCUMENTS 2,924,546  2/1960  Shaw ................................ 428/63 X
3,193,424  7/1965  Scott ............................... 156/153 X
3,622,371  11/1971  Sparks .............................. 156/94 X Primary Examiner—Robert A. Dawson

[57] ABSTRACT

This method of repairing gasoline tanks is designed to be safe in application and lasts for the life of the tank. Primarily, it consists of employing the use of a glass-resin blend, fiber, peroxide, a roller, and applicator brush, a razor knife, and a sandblasting machine. Fiber cloth patches are cut to size and placed over the leak holes after they have been found by pouring gasoline on the tank, and fiber cloth is then cut to a suitable size and formed to the contour of the tank, after which, the glass resin is applied, etc.

1 Claim, 9 Drawing Figures

FIBERGLASS GASOLINE TANK REPAIR PROCESS

This invention relates to gasoline tanks, and more particularly, to a fiberglass gasoline tank repair process.

The principal object of this invention is to provide a fiberglass gasoline tank repair process, which will be employed to give unlimited protection against possible leaks, since ninty-five percent of all such leaks occur where the two halves of a gasoline tank are bonded together.

Another object of this invention is to provide a fiberglass gasoline tank repair process, which will take the place of the unsafe prior art method of welding or brazing a leak area of a gasoline tank.

A further object of this invention is to provide a fiberglass gasoline tank repair process, which will be easy to perform and will require little time in doing so.

Other objects are to provide a fiberglass gasoline tank repair process, which is simple in design, inexpensive to manufacture, rugged in construction, easy to use, and efficient in operation.

These, and other objects, will be readily evident, upon a study of the following specification, and the accompanying drawing, wherein.

Figure 1:
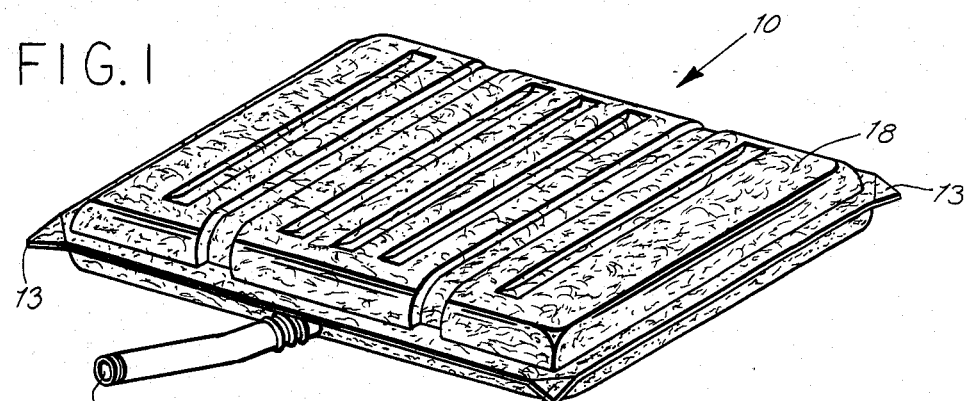
FIG. 1 is a perspective view of the present invention.
Figure 2:
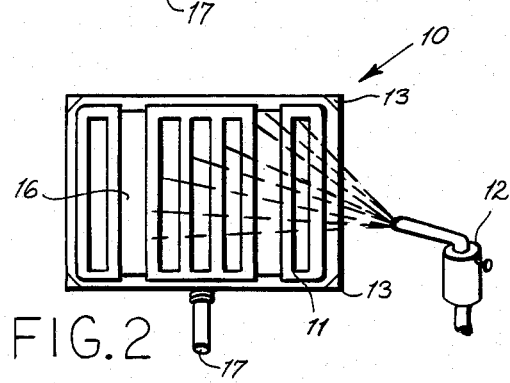
FIG. 2 is a top plan view of the tank, shown being sanded.
Figure 3:
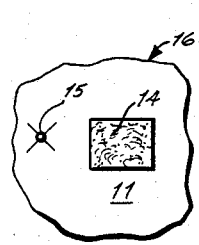
FIG. 3 is a fragmentary plan view of the tank, illustrating a patch and a hole.
Figure 4:
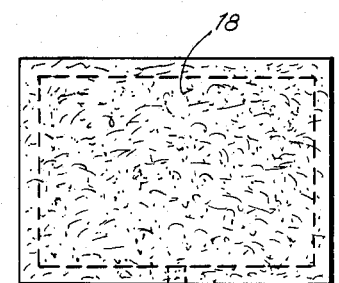
FIG. 4 is a plan view of a tank, shown covered by a sheet of fiberglass.
Figure 5:
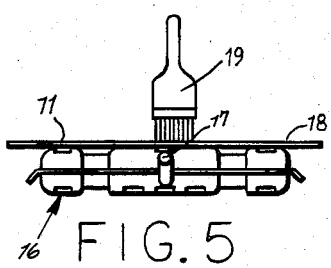
FIG. 5 is a side elevational view of a resin and brush application.
Figure 6:
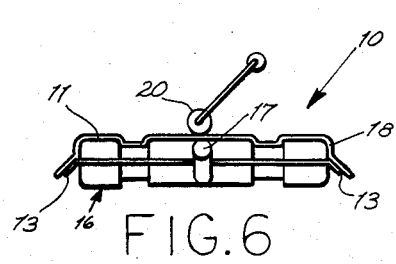
FIG. 6 is a side elevational view of the roller stage of the process.
Figure 7:
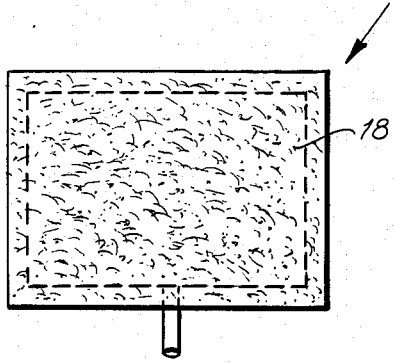
FIG. 7 is a bottom plan view of the tank, shown covered by a sheet of fiberglass.
Figure 8:
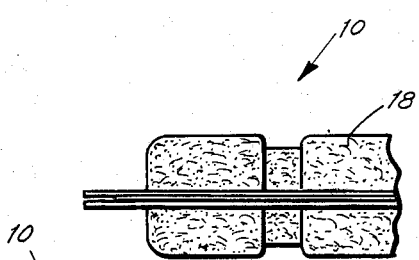
FIG. 8 is a fragmentary side elevational view of both sides, shown coated with fiberglass.
Figure 9:
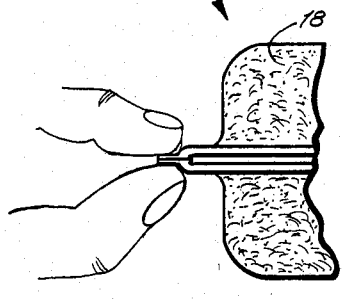
FIG. 9 is a fragmentary side view of the end sealing of the top and bottom fiberglass layers.

Accordingly, a gasoline tank 10, that needs repair, is plugged at its inlet and outlet, and the outside surface 11 is thoroughly sandblasted with silica sand by gun 12, until tank 10 is perfectly clean. The second step is to pour gasoline on, so as to detect leaks in the tank, which are then marked.

(The materials and tools to be used are as follows: glass-resin blend 72-41-T15, fiber 1½ ounce×50 inch, MEK Peroxide (400 cc. to ½ gal.), three inch roller and applicator brush, and a razor knife.)

After the abovementioned has been accomplished, the first side of the tank 10 is done, which has the lips 13 turned downward, after a fiber patch 14 has been placed over the leak opening or openings 15, through the wall or walls 16. After the above has been accomplished, the other side is done and the edges sealed.

The method of application is as follows:

STEP I

The inlet and outlet openings are suitably plugged, to prevent foreign matter from entering the tank 10, and the tank 10 is then sandblasted with the sandblast gun 12, until the outside walls 16 are perfectly cleaned with the silica sand used.

STEP II

Gasoline is poured on the tank 10, so as to detect leaks therein, which are then marked.

STEP III

Dependent upon whether the lips 13 on tank 10 are turned upward, downward, or straight, the first side of the tank 10 to be done is the side upon which the lips 13 turn downward. The fiber 18 is then loosened with the user's hands to break it down, so as to conform more easily with the contours of tank 10. Patches 14, of fiber, are then placed over the leak holes or openings 15 in the walls 16. The peroxide with resin is then mixed, 40 cc. to ½ gallon of resin, and next, applied with the applicator brush 19 to the tank, using the three inch roller 20. The roller 20 is used on the tank 10, until all bubbles are forced out, and the fiber 18 is thoroughly soaked.

STEP IV

A sheet of fiber 18 is now placed over the side of the tank 10, and cut to dimensions, enabling an overhang over the lips 13 of tank 10, approximately one to two inches. The fiber 18 is then cut around the corner of tank 10, as if wrapping a package. Next, apply the resin peroxide mixture with the applicator brush 19, soaking the fiber 18 thoroughly. Using the roller 20, the air bubbles are all forced out, and the roller is still used until the fiber 18 has been thoroughly soaked and adheres tightly to the tank 10, and while the fiberglass is in the semihard stage, meaning not sticky to the touch. The fiber 18 is then pressed snugly to the rim of the tank 10 and tamped in, forcing out all air bubbles forming on the lip 13 of tank 10.

STEP V

The tank 10 is then left to dry for approximately twenty-five to thirty minutes, or until the surface is not sticky to the touch. Next, the razor knife is used to peel off and cut the excess fiberglass around the lips 13 of tank 10, leaving approximately one-fourth to three-eighths of an inch glass lip, over the original metal lip 13 of the tank 10.

STEP VI

The tank 10 is next turned to the second side, and steps III and IV are repeated.

STEP VII

The fiber mat is then pulled tight, and tucked in the rim of the tank 10, and brushed down. After the above, the mat is slit on the corners, so it will lie flat when rolled down.

STEP VIII

To seal the lip 13 of the tank 10, glass to glass, the user runs his finger lightly along the two layers of glass, forcing all air bubbles out. The new glass lips, not the metal, are then sealed to each other.

STEP IX

The second side of the tank 13 is then left to dry, for twenty-five to thirty minutes, or until not sticky to the touch. After the above, the user employs the razor knife, to trim the excess fiberglass around the lip left in step V.

While various changes may be made in the detail construction, it is understood that such changes will be within the spirit and scope of the present invention, as is defined by the appended claims.

I claim:

1. A fiberglass gasoline tank repair process, comprising a first step of plugging inlet and outlet openings of a gasoline tank, then sandblasting an outer side of said tank with silica sand, then pouring gasoline on said outer side of said tank so as to detect any tank hole leaks, then applying patches of a fiber material over any detected tank leak holes, then a mixture of a peroxide and resin being applied to said tank and over said fiber patches by using a brush, then a roller is rolled across said patches so as to squeeze out any air bubbles, and said fiber is left thoroughly soaked, then a sheet of said fiber material is applied against an upper flat side of said tank, said fiber sheet being sufficiently large to overhang around all side walls of said tank and around a flanged lip formed along said side walls, said sheet then being cut to fit around corners of said tank for wrapping snug therearound, then said sheet being thoroughly soaked with said mixture, then being rolled with said roller so that said sheet conforms to a contour of said tank and around said flanged lip, holding thereto with all air bubbles squeezed out, said tank then being left to dry, said tank then being turned over and a second like fiber sheet being likewise applied to an opposite side of said tank, said second sheet being likewise cut, wrapped, soaked and rolled in sequence, and edges of both said sheets extended around edges of said tank flanged lip being joined together with likewise soaking with said mixture, then squeezed together by fingers and a surplus beyond a bonding edge thereof being cut off with a razor knife after being dried.

* * * * *